United States Patent
Hounyo et al.

(10) Patent No.: US 11,418,423 B2
(45) Date of Patent: Aug. 16, 2022

(54) SYSTEMS AND METHODS FOR ESTABLISHING A VIRTUALIZED CHANNEL AND COMMUNICATING THEREWITH

(71) Applicant: Caterpillar Inc., Peoria, IL (US)

(72) Inventors: Josiah Armel Hounyo, Farmers Branch, TX (US); Vijay Krishna Yalamanchili, Champaign, IL (US); Darin J. McCoy, Peoria, IL (US); Tyler Jewell, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/123,028

(22) Filed: Dec. 15, 2020

(65) Prior Publication Data

US 2022/0191122 A1  Jun. 16, 2022

(51) Int. Cl.
*H04L 43/50* (2022.01)
*G06F 17/18* (2006.01)
*H04L 43/08* (2022.01)
*G06N 20/00* (2019.01)

(52) U.S. Cl.
CPC .............. *H04L 43/50* (2013.01); *G06F 17/18* (2013.01); *H04L 43/08* (2013.01); *G06N 20/00* (2019.01)

(58) Field of Classification Search
CPC ................................ H04L 43/50; H04L 43/08
See application file for complete search history.

(56) References Cited

U.S. PATENT DOCUMENTS

| | | | | |
|---|---|---|---|---|
| 5,122,955 A | * | 6/1992 | Ishikawa | B62D 7/159 701/43 |
| 5,311,432 A | * | 5/1994 | Momose | B62D 15/0245 701/41 |
| 7,440,829 B2 | * | 10/2008 | Hara | B62D 15/024 701/41 |

(Continued)

FOREIGN PATENT DOCUMENTS

| | | | | |
|---|---|---|---|---|
| WO | 2019134873 A1 | | 7/2019 | |
| WO | WO-2020010351 A1 | * | 1/2020 | ........... A61B 8/4245 |
| WO | 2020084279 W | | 4/2020 | |

OTHER PUBLICATIONS

Written Opinion and International Search Report for Int'l. Patent Appln. No. PCT/US2021/062298, dated Mar. 23, 2022 (14 pgs).

*Primary Examiner* — Philip C Lee
(74) *Attorney, Agent, or Firm* — Perkins Coie LLP

(57) ABSTRACT

The present disclosure is directed to systems and methods for virtualizing communications within a plurality of telematics channels operatively connected to a target machine. The method includes (i) generating a virtualized channel in addition to the plurality of telematics channels operatively connected to the target machine; (ii) predicting one or more values for the virtualized channel based on a mathematical function derived from a first set of telematics channels of a source machine; (iii) receiving measurements from the plurality of telematics channels from the target machine; and (iv) applying the mathematical function to the target machine based upon the one or more predicted values of the virtualized channel and the received measurements from the plurality of telematics channels from the target machine.

18 Claims, 7 Drawing Sheets

(56) References Cited

U.S. PATENT DOCUMENTS

| | | | | |
|---|---|---|---|---|
| 8,594,892 | B2* | 11/2013 | Fujimoto | B62D 15/024 |
| | | | | 703/2 |
| 8,843,423 | B2 | 9/2014 | Chu et al. | |
| 9,248,859 | B2* | 2/2016 | Christ | B62D 15/024 |
| 10,732,261 | B1* | 8/2020 | Wang | G06T 7/207 |
| 2009/0207079 | A1* | 8/2009 | Samukawa | G01S 13/931 |
| | | | | 342/438 |
| 2017/0132922 | A1* | 5/2017 | Gupta | G06F 3/0488 |
| 2020/0207412 | A1* | 7/2020 | Al Assad | E01C 7/356 |
| 2020/0256036 | A1* | 8/2020 | Hodel | E02F 9/2079 |
| 2020/0257607 | A1* | 8/2020 | Hodel | G06F 11/3447 |
| 2020/0389387 | A1* | 12/2020 | Magzimof | H04W 28/0236 |

\* cited by examiner

|  | Channel 1 | Channel 2 | Channel 3 | Channel 4 | ... | Channel X |
|---|---|---|---|---|---|---|
| Sensor 1 | v |  |  |  | ... |  |
| Sensor 2 |  | v |  |  | ... |  |
| Sensor 3 |  | v | v |  | ... |  |
| Sensor 4 |  |  |  | v | ... |  |
| ... | ... | ... | ... | ... | ... | ... |
| Sensor Y |  |  |  |  | ... | v |

*FIG. 4*

SYSTEMS AND METHODS FOR ESTABLISHING A VIRTUALIZED CHANNEL AND COMMUNICATING THEREWITH

TECHNICAL FIELD

The present technology is directed to systems and methods for communicating and monitoring via telematics channels. More particularly, systems and methods for monitoring and/or communicating with a target machine with a "virtualized" channel are disclosed herein.

BACKGROUND

Telematics data is widely used for monitoring and communicating with multiple machines. Telematics data includes various types of information communicated via multiple types of telematics channels. For different types of machines, the corresponding telematics channels can be different. Accordingly, using the telematics channels to communicate and monitor multiple types of machines with different telematics channels can be difficult and challenging. Therefore, it is advantageous to have an improved method to address this issue.

BRIEF DESCRIPTION OF THE DRAWINGS

Non-limiting and non-exhaustive examples are described with reference to the following figures.

FIG. 4 is a schematic diagram illustrating relationships among sensors and telematics channels in accordance with embodiments of the present technology.

DETAILED DESCRIPTION

Figure 1:
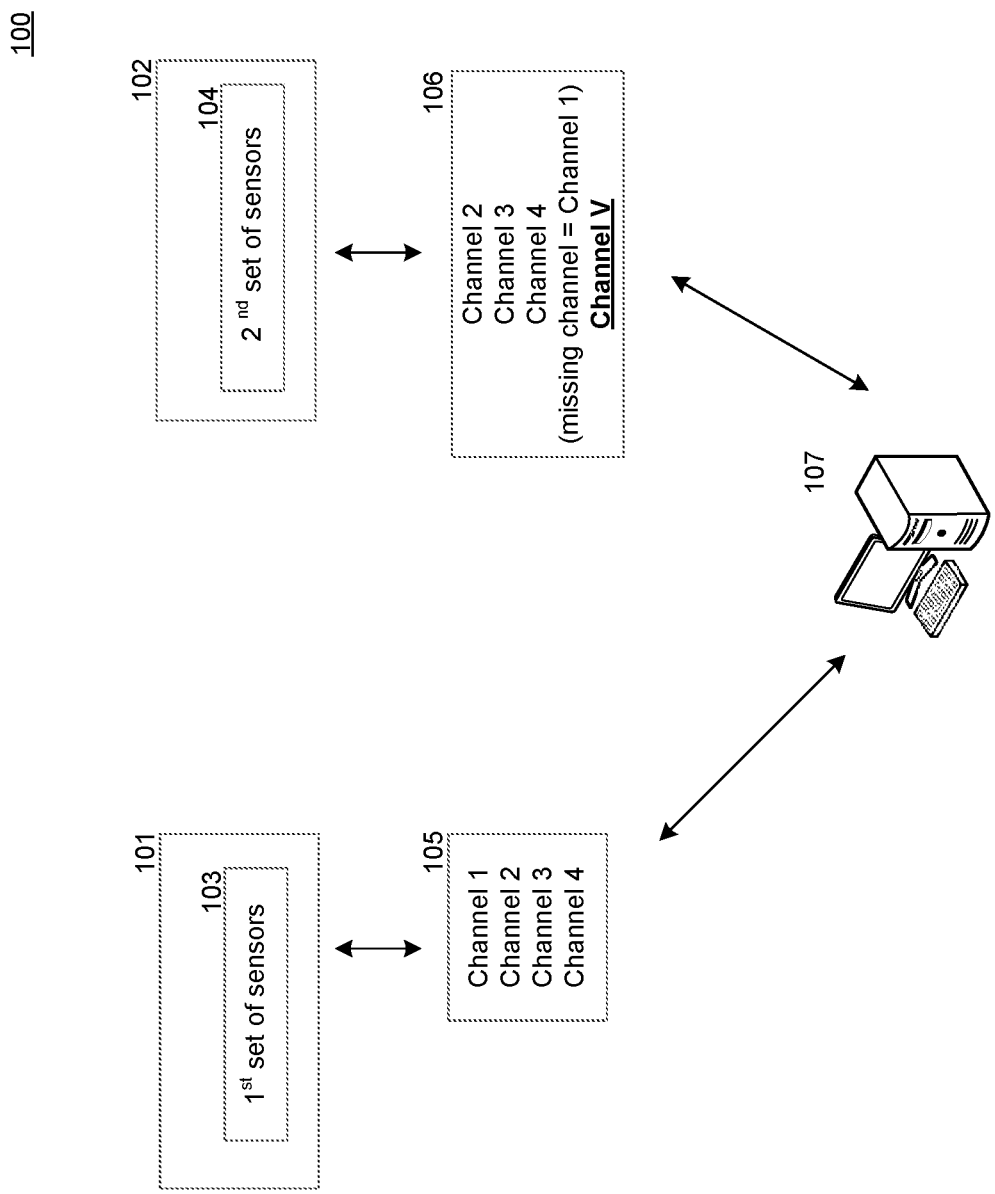
FIG. 1 is a schematic diagram illustrating a system in accordance with embodiments of the present technology.

Various aspects of the disclosure are described more fully below with reference to the accompanying drawings, which form a part hereof, and which show specific exemplary aspects. Different aspects of the disclosure may be implemented in many different forms and should not be construed as limited to the aspects set forth herein. Rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation, or an implementation combining software and hardware aspects. The following detailed description is, therefore, not to be taken in a limiting sense.

The present technology is directed to systems and methods for communicating and monitoring a target machine via a "virtualized" channel. By establishing the virtualized channel, the present technology enables an operator to manage, communicate, and/or monitor multiple machines with different telematics channels.

For example, a fleet of machines can include two models of machines, $M_1$ and $M_2$. The $M_1$ machine has telematics Channels $C_1$-$C_{10}$, whereas the $M_2$ machine has only Channels $C_1$-$C_9$. In this example, telematics channel $C_{10}$ can be identified as a "missing" channel. Based on analyzing all the telematics channels $C_1$-$C_{10}$ (e.g., analyzing the relationships thereof, to be discussed in detail below), a "virtualized" channel can be generated for the $M_2$ machine, and the "virtualized" channel can be used as the missing channel (i.e. Channel $C_{10}$).

For example, in some embodiments, the missing channel can be used to transmit message, signals, and/or information related to a steering angle of the $M_1$ machine. After the virtualized channel is generated, the operator can use this channel to communicate with or monitor the $M_2$ machine. In other words, the operator can communicate with and monitor all the machines in the fleet by using generally the same set of telematic channels (i.e., Channels $C_1$-$C_{10}$ and Channel $C_1$-$C_9$ plus the virtualized channel), which enhances the overall communication efficiency.

The present technology can analyze the relationships among multiple telematics channels and derive at least one mathematical function, equation, or formula to represent a relationship of each channel with other channels. For example, the result of the analysis can indicate that telematics Channels $C_2$ and $C_5$ are closely related to telematics Channel $C_{10}$. For example, the relationship among telematics Channels $C_2$, $C_5$, and $C_{10}$ can be represented as Equation $E_1$ below.

$$M(C10)=k1*M(C2)+k2*M(C_5) \qquad (E_1)$$

In Equation ($E_1$), "M(C10)" stands for measurements or information communicated in the telematics Channel $C_{10}$. "M(C2)" refers to measurements or information communicated in the telematics Channel $C_2$, and "M(C5)" refers to measurements or information communicated in the telematics Channel $C_5$. "k1" and "k2" are weighting coefficients. Based on Equation ($E_1$), the present technology can use the measurements/information from the telematics Channels $C_2$ and $C_5$ to simulate measurements/information in the telematics Channel $C_{10}$. Since Machine $M_2$ does not have the telematics channel $C_{10}$ (i.e., the "missing" channel) but does have the telematics Channels $C_2$ and $C_5$, the virtualized channel for Machine $M_2$ can be established based on Equation ($E_1$). The virtualized channel for Machine $M_2$ is to be treated as the missing channel that Machine $M_1$ has.

In some embodiments, the relationships among the telematics channels can be determined based on a machine learning (ML) process, a linear or logistic regression process, and/or other suitable process. For example, the weighting coefficients in Equation $E_1$ can be determined after a ML training process based on collected telematics data.

FIG. 1 is a schematic diagram illustrating a system 100 in accordance with embodiments of the present technology. The system 100 includes a source device 101 and a target device 102. In some embodiments, the source device 101 and the target device 102 can be similar devices (e.g., with different models, trims, versions, modifications, etc.) of a group of devices managed or monitored by an operator or a server. In some embodiments, the group of devices can include vehicles (e.g., trucks), machines (e.g., mining machines), and/or other suitable devices.

The source device 101 includes a first set of sensors 103. The first set of sensors 103 are configured to monitor the status of the source device 101 and/or to measure the surroundings thereof. The measurements of the first set of sensors 105 can be transmitted to a server 107 via a first set of channels 105 (Channels 1-4 are shown in FIG. 1). The server 107 can communicate with the source device 101 via the first set of channels 105. For example, the server 107 can send messages, signals, instructions, and/or other suitable information to the source device 101 through the first set of channels 105. In some embodiments, the first set of channels 105 can include telematics channels or any other suitable communication channels.

Similarly, the target device 102 includes a second set of sensors 104 configured to monitor the status of the target device 102 and/or to measure the surroundings thereof. The measurements of the second set of sensors 104 can be transmitted to the server 107 via a second set of channels 106 (Channels 2-4 are shown in FIG. 1). The server 107 can communicate with the target device 102 via the second set of channels 106 by sending messages, signals, instructions, and/or other suitable information to the target device 102 through the second set of channels 106. In some embodiments, the second set of channels 106 can include telematics channels or any other suitable communication channels.

In the embodiment illustrated in FIG. 1, the first set of channels 105 (which includes Channels 1-4) and the second set of channels 106 (which includes Channels 2-4) are different. As shown, the first set of channels 105 includes a "missing" channel that is not included in the second set of channels 106 (which is "Channel 1" in this embodiment). For the server 107 to efficiently monitor and manage both the source device 101 and the target device 102, the present technology can generate a virtualized channel V such that it can be utilized in the way similar to the missing channel when the server 107 monitors and/or communicates with the target device 102.

To generate the virtualized channel V, the measurements from the first set of sensors 103 through the first set of channels 105 are analyzed. In some embodiments, the first set of channels 105 can be analyzed based on a feature standardization, scaling, or normalization process. In some embodiments, the first set of channels 105 can be binarized based a threshold T, according to Equation $E_2$ below.

$$f(x) = \begin{cases} 0, & |x| < T \\ 1, & |x| \geq T \end{cases} \quad (E2)$$

In Equation $E_2$, parameter "x" refers to corresponding to values communicated in a channel. Function "f(x)" stands for a function corresponding to the channel after the binarization process.

The first set of channels 105 can be analyzed to derive a mathematical function that represents a relationship of each channel in the first set of channels 105. For example, the mathematical function for Channel 1 can be indicative that the measurements of Channel 1 correlate to the measurements of Channels 2 and 3, but not to the measurement of Channel 4. In some embodiments, the mathematical function can be derived based on a machine learning (ML) process, a linear or logistic regression process, and/or any other suitable analytical schemes.

In some embodiment, the derived mathematical function can be further evaluated or verified so as to mitigate the impact of data noise or "false alerts." For example, a typical value range of the missing channel (e.g., Channel 1 in the illustrated embodiment) can be used to evaluate the derived mathematical function for the missing channel.

In some embodiments, a channel-analysis model can be used to derive the mathematical functions for all the channels in the first set of channels 105. The channel-analysis model can be validated, adjusted, trained, fine-tuned based on empirical data so as to improve its accuracy and applicability. For example, in some embodiments, the empirical data can be from a large number of devices similar to the source device 101. The empirical data can be split into various sets for training and testing and then the results thereof are compared and utilized to improve the channel-analysis model.

For example, the channel-analysis model can be a logistic regression model as described in Equation $E_3$ below.

$$p = \frac{1}{1 + e^{-\beta_0 - \beta_1 * x - \beta_2 * y - \beta_3 * z}} \quad (E3)$$

Parameters "x," "y," and "z" are predictor or input variables. The channel-analysis model can determine the probability "p" that these predictor variables are related to a response variable. In the illustrated embodiments, the predictor variables correspond to channels 2-4, whereas the response variable corresponds to the missing channel. Constant "e" is Euler's number. Parameter "β" is a coefficient. In other embodiments, the channel-analysis model can be other type of analytical or statistical models.

Advantages of the channel-analysis model include that (i) it is convenient to use generated coefficients to create simple functions (e.g., the derived mathematical function discussed above) without further data training; (ii) it does not require a standardization process; (iii) it can be used to accommodate new data by generating new coefficients; and (iv) it can be readily applied to data from similar statistical populations. In some embodiments, certain statistical model (e.g., an analysis-of-variance (ANOVA) model) can be used for scaling the channel-analysis model from one population (e.g., a group of source devices 101) to another population (a group of target devices 102).

Based on the derived mathematical functions for all the channels in the first set of channels 105 (including the missing channel, Channel 1), the virtualized channel V can be generated. The server 107 can then communicate with the target device 102 via the virtualized channel V in the way similar to what it does to communicate with the source device 101 via Channel 1. For example, the server 107 can send a message to the target device 102 via the virtualized channel V in the way similar to what it does to communicate with the source device 101 via Channel 1. In some embodiments, the virtualized channel V can be used to monitor a condition of the target device 102. For example, the virtualized channel V can be used to detect an incident (e.g., a failure, an abnormal condition, a malfunction, etc.) of the target device 102. In some embodiments, the detected incident can be used (i) as feedback to the channel-analysis model so as to improve the same and/or (ii) as data for further research and development of a future model of the target device 102.

As another example, assuming that the mathematical function for Channel 1 indicates that the measurements of channel 1 correlate to the measurements of Channels 2 and 3, a "virtual measurement" or a "predicted value" for the virtualized channel V can be generated based on the mathematical function for channel 1 as well as the measurements of the Channels 2 and 3 from the target device 102. The virtual measurements or predicted values can be transmitted to the server 107 via the virtualized channel V.

Adding the virtualized channel V to the second set of channels 106 makes that the first and second sets of channels 105, 106 can be considered having substantially the same set of channels. By the foregoing arrangement, the present technology enables the server 107 to manage, monitor, and communicate with both the source device 101 and the target device 102, as well as other devices similar to the source device 101 and the target device 102 efficiently and conveniently.

Figure 2:
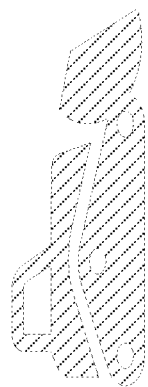
FIG. 2 is a schematic diagram illustrating another system in accordance with embodiments of the present technology.
Figure 2:
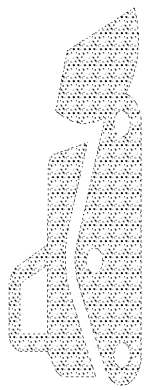
Figure 2:
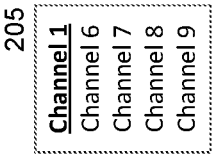
Figure 2:
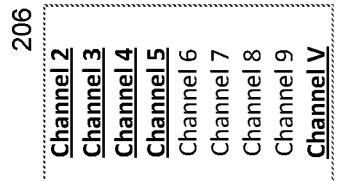
Figure 2:
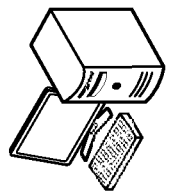

FIG. 2 is a schematic diagram illustrating another system 200 in accordance with embodiments of the present technology. The system 200 includes a source machine 201 and a target machine 202. In some embodiments, the source machine 201 and the target machine 202 can be similar machines with different components (e.g., sensors) In some embodiments, the source machine 201 can include a first set of sensors for measuring various factors such as a peak frame bias, a ground speed, a payload status, a throttle pedal position, and a steering angle. In some embodiments, the target machine 202 can include a second set of sensors for measuring various peak frame bias, ground speed, a payload status, and a throttle pedal position. A server 207 is configured to receive measurements from the source machine 201 and the target machine 202 and monitor the same.

The source machine 201 can communicate with the server 207 via a first set of channels 205. Each channel of the first set of channels 205 corresponds to a machine-related factor, as shown in Table 1 below.

TABLE 1

| Channel | Factor to measure |
| --- | --- |
| 1 | steering angle |
| 6 | peak frame bias |
| 7 | ground speed |
| 8 | payload status |
| 9 | throttle pedal position |

Similarly, the target machine 202 can communicate with the server 207 via a second set of channels 206. Each channel of the second set of channels 206 corresponds to a machine-related factor, as shown in Table 2 below.

TABLE 2

| Channel | Factor to measure |
| --- | --- |
| 2-5 | Reserved |
| 6 | peak frame bias |
| 7 | ground speed |
| 8 | payload status |
| 9 | throttle pedal position |

Comparing the first and second sets of channels 205, 206, a missing channel "Channel 1" of the source machine 201 can be identified. In the illustrated embodiment, since "Channels 2-5" are only "reserved" channels, for the purpose of clarity, only the missing channel of the source machine 201 is discussed. As shown in Table 1, the identified missing channel "Channel 1" is used to transmit measurements/information relating to the steering angle of the source machine 201. To enable the server 207 to communicate with both the source machine 201 and the target machine 202 via substantially the same channels, a virtualized channel V for the identified missing channel "Channel 1" can be generated.

Note that, in some embodiments, "Channels 2-5" of the target machine can also be identified as "missing channels" in the target machine 202 in a similar fashion. Accordingly, corresponding virtualized channels for the source machine 201 can be generated.

To generate the virtualized channel V, the measurements/information through the first set of channels 205 for the source machine 205 are analyzed. In some embodiments, the first set of channels 205 can be analyzed based on a feature standardization, scaling, or normalization process. In some embodiments, the first set of channels 205 can be binarized based a threshold T (see, e.g., Equation $E_2$ above). The first set of channels 205 can be analyzed to derive a mathematical function that represents a relationship of each channel in the first set of channels 205. For example, the mathematical function for Channel 1 can be indicative that the measurements of Channel 1 correlate to the measurements of Channels 6 (for "peak frame bias") and 7 (for "ground speed"). In some embodiments, the mathematical function can be derived based on a ML process, a linear or logistic regression process, and/or any other suitable analytical schemes.

In some embodiment, the derived mathematical function can be further evaluated or verified so as to mitigate the impact of data noise or "false alerts." For example, a typical value range of the missing channel can be used to evaluate the derived mathematical function for the missing channel. In some embodiments, a channel-analysis model can be used to derive the mathematical functions for all the channels in the first set of channels 205. The channel-analysis model can be validated, adjusted, trained, fine-tuned based on empirical data so as to improve its accuracy and applicability.

Based on the derived mathematical functions for the missing channel, Channel 1, the virtualized channel V can be generated. The server 207 can then communicate with the target machine 202 via the virtualized channel V in the way similar to what it does to communicate with the source machine 201 via Channel 1. For example, the server 207 can send a message to or receive measurements from the target machine 102 via the virtualized channel V.

Based on the foregoing arrangement, the present technology enables the server 207 to manage, monitor, and communicate with a group of machines including the source machine 201 and the target machine 202 efficiently and conveniently.

Figure 3:
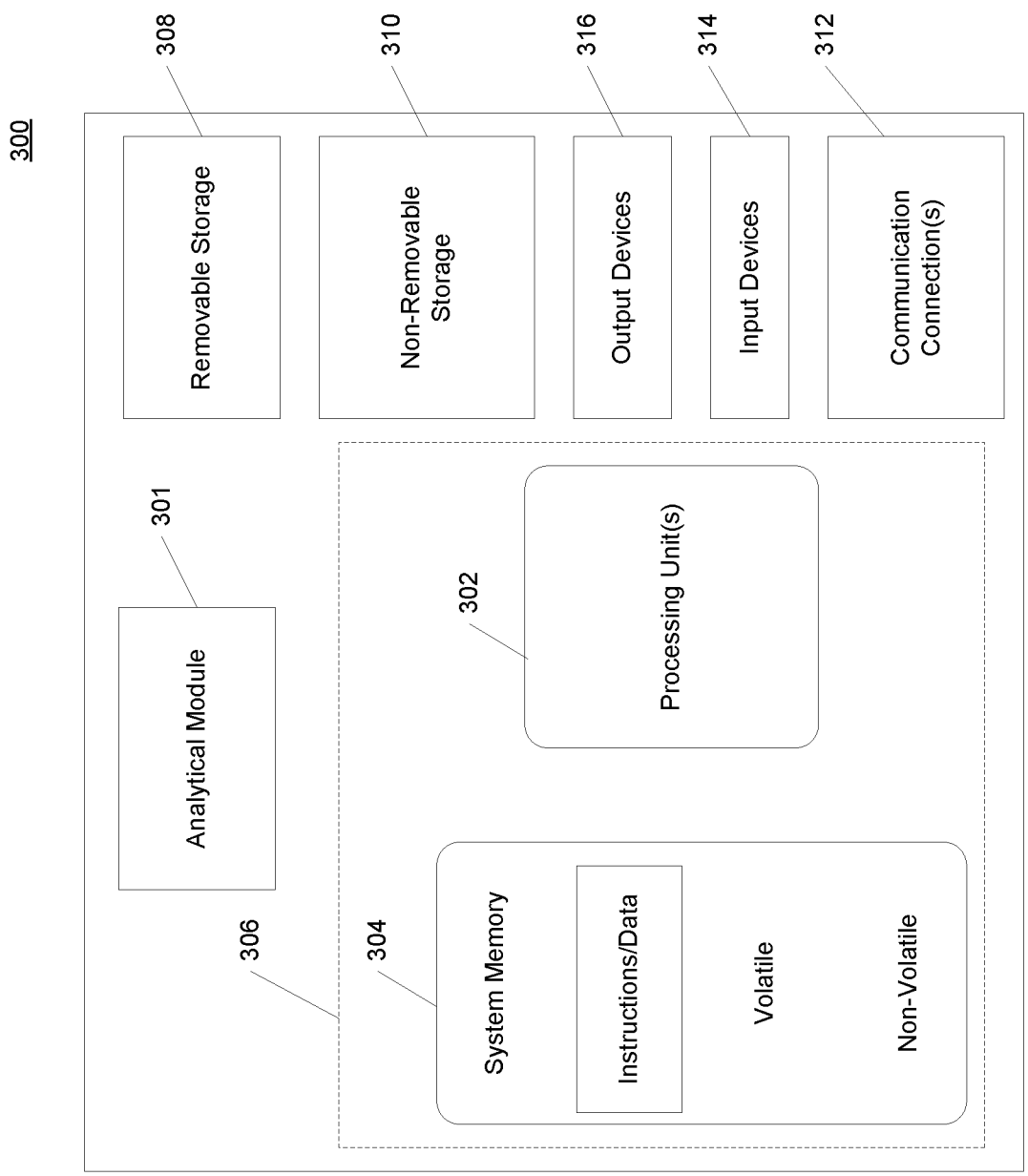
FIG. 3 is a schematic diagram illustrating components in a computing device in accordance with embodiments of the present technology.

FIG. 3 is a schematic system diagram illustrating components in a computing device 300 in accordance with embodiments of the present technology. The computing device 300 can be implemented as a server (e.g., the server 101 or 201 discussed herein). The computing device 300 is configured to process the methods (e.g., FIGS. 5-7) discussed herein. Note the computing device 300 is only an example of a suitable computing device and is not intended to suggest any limitation as to the scope of use or functionality. Other well-known computing systems, environments, and/or configurations that may be suitable for use include, but are not limited to, personal computers (PCs), server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, the computing device 300 includes at least one processing unit 302 and a memory 304. Depending on the exact configuration and the type of computing device, the memory 504 may be volatile (such as RAM), non-volatile (such as ROM, flash memory, etc.), or some combination of the two. This most basic configuration is illustrated in FIG. 3 by dashed line 306. Further, the computing device 300 may also include storage devices (a removable storage 508 and/or a non-removable storage 310) including, but not limited to, magnetic or optical disks or tape. Similarly, the computing device 300 can have an input device 314 such as keyboard, mouse, pen, voice input, etc. and/or an output device 316 such as a display, speakers, printer, etc. Also included in the computing device 300 can be one or more communication connections, 312, such as LAN, WAN, point to point, any other suitable interface, etc.

The computing device 300 can include an analytical module 301 configured to implement methods for virtualizing communications within a plurality of telematics channels operatively connected to a target machine. In some embodiments, the analytical module 301 can be in form of instructions, software, firmware, as well as a tangible device.

The computing device 300 includes at least some form of computer readable media. The computer readable media can be any available media that can be accessed by the processing unit 302. By way of example, the computer readable media can include computer storage media and communication media. The computer storage media can include volatile and nonvolatile, removable and non-removable media (e.g., removable storage 308 and non-removable storage 310) implemented in any method or technology for storage of information such as computer readable instructions, data structures, program modules or other data. The computer storage media can include, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

The communication media can include non-transitory computer readable instructions, data structures, program modules, or other data. The computer readable instructions can be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, the communication media can include wired media such as a wired network or direct-wired connection, and wireless media such as acoustic, radio frequency (RF), infrared and other wireless media. Combinations of the any of the above should also be included within the scope of the computer readable media.

The computing device 300 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

FIG. 4 is a schematic diagram illustrating relationships among sensors and telematics channels in accordance with embodiments of the present technology. For example, as shown in FIG. 4, Sensor 1 is associated with telematics Channel 1. In other words, the telematics Channel 1 can be used by a server (e.g., the server 107 or 207) to communicate with a device (e.g., the source device 101 or the target device 102) or a machine (e.g., the source machine 201 or the target machine 202) for measurement and/or information associated with Sensor 1. In some embodiments, a sensor can be associated with two or more channels. For example, as shown in FIG. 4, Sensor 3 is associated with Channels 3 and 4. In some embodiments, a channel can be associated with two or more sensors. For example, both Sensor 2 and Sensor 4 are associated with Channel 2.

Figure 5:
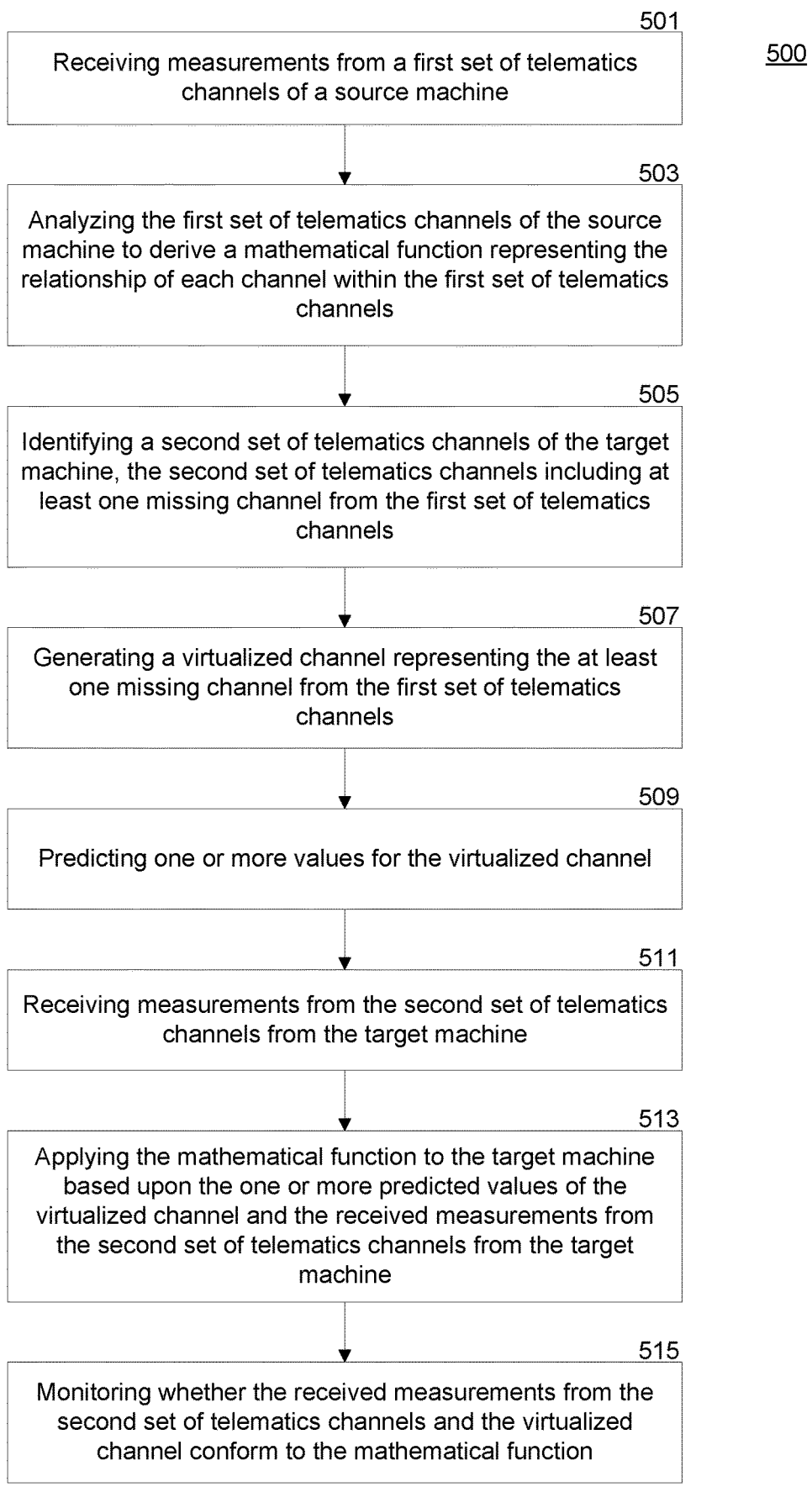
FIG. 5 is a flow diagram showing a method for virtualizing communications within a plurality of telematics channels operatively connected to a target machine in accordance with embodiments of the present technology.

FIG. 5 is a flow diagram showing a method 500 for virtualizing communications within a plurality of telematics channels operatively connected to a target machine in accordance with embodiments of the present technology. The method 500 can be implemented by a server (e.g., the server 107 or 207), a computing device (e.g., the computing device 300), and/or any other suitable devices.

The method 500 starts at block 501 by receiving measurements from a first set of telematics channels of a source machine. In some embodiments, the source machine can be a Model-1 truck capable of communicating in telematic Channels 1-100.

At block 503, the method 500 continues by analyzing the first set of telematics channels of the source machine to derive a mathematical function representing a relationship of each channel within the first set of telematics channels. Embodiments, of the mathematical function can be found at, for example, Equation $E_1$ discussed above.

At block 505, the method 500 continues by identifying a second set of telematics channels of the target machine. The second set of telematics channels includes at least one missing channel from the first set of telematics channels. In some embodiments, the target machine can be a Model-2 truck capable of communicating in telematic Channels 1-99. In such embodiment, the missing channel can be telematic Channel 100.

At block 507, the method 500 continues by generating a virtualized channel representing the at least one missing channel from the first set of telematics channels. In some embodiments, the virtualized channel can be generated based on analyses on the first set of telematics channels based on a feature standardization, scaling, or normalization process. In some embodiment, a binarization process can be involved. In some embodiments, the analyses can involve a ML process, a linear or logistic regression process, and/or any other suitable analytical schemes.

At block 509, the method 500 continues by predicting one or more values for the virtualized channel. For example, in some embodiments, a ML process, a linear or logistic regression process, and/or any other suitable analytical schemes can be used to predict the values for the virtualized channel.

At block 511, the method 500 includes receiving measurements from the second set of telematics channels from the target machine. For example, the measurements in telematics Channels 1-99 of the Model-2 truck are received for further use.

At block 513, the method 500 continues by applying the mathematical function to the target machine based upon the one or more predicted values of the virtualized channel and the received measurements from the second set of telematics channels from the target machine. For example, the derived mathematical function for the missing channel, such as telematics Channel 100, can be used to simulate a measurement for the virtualized channel, based on the measurements from the other channels, such as telematics Channels 1-99.

At block 515, the method 500 can monitor whether the measurements from the second set of telematics channels and the virtualized channel conform to the mathematical function. By this arrangement, the target machine can be monitored or communicated in substantially the same set of telematics channels as the source machine. In some embodiments, a "range of conformance" or a threshold value can be used to make the forgoing determination. For example, when the difference between (i) the received measurements and (ii) expected values determined by the mathematical function is less than the threshold value or within the range of conformance, it is determined that the received measurements from the second set of telematics channels and the virtualized channel conform to the mathematical function. When the foregoing deference is greater than the threshold value or not within the range of conformance, it is determined that the measurements from the second set of telematics channels and the virtualized channel do not conform to the mathematical function.

In some embodiments, in an event that the measurement from the second set of telematics channels and the virtualized channel conform to the mathematical function, a first signal indicating a "normal" incident can be generated and transmitted to a server or an operator. The normal incident (as well as related data) can be recorded or stored for future reference. In some embodiments, in an event that the measurements from the second set of telematics channels and the virtualized channel do not conform to the mathematical function, a second signal indicating an "abnormal" incident can be generated and transmitted to the server or the operator. The abnormal incident (as well as related data) can be analyzed so as to adjust or update the mathematical function accordingly.

In some embodiments, the method 500 can include deriving the mathematical function at least partially based on a ML process, a linear or logistic regression process, etc. In some embodiments, the virtualized channel is associated with a steering angle of the target machine. In some embodiments, the received measurements from the target machine include a peak frame bias, a ground speed, a payload status, and/or a throttle pedal position of the target machine.

Figure 6:
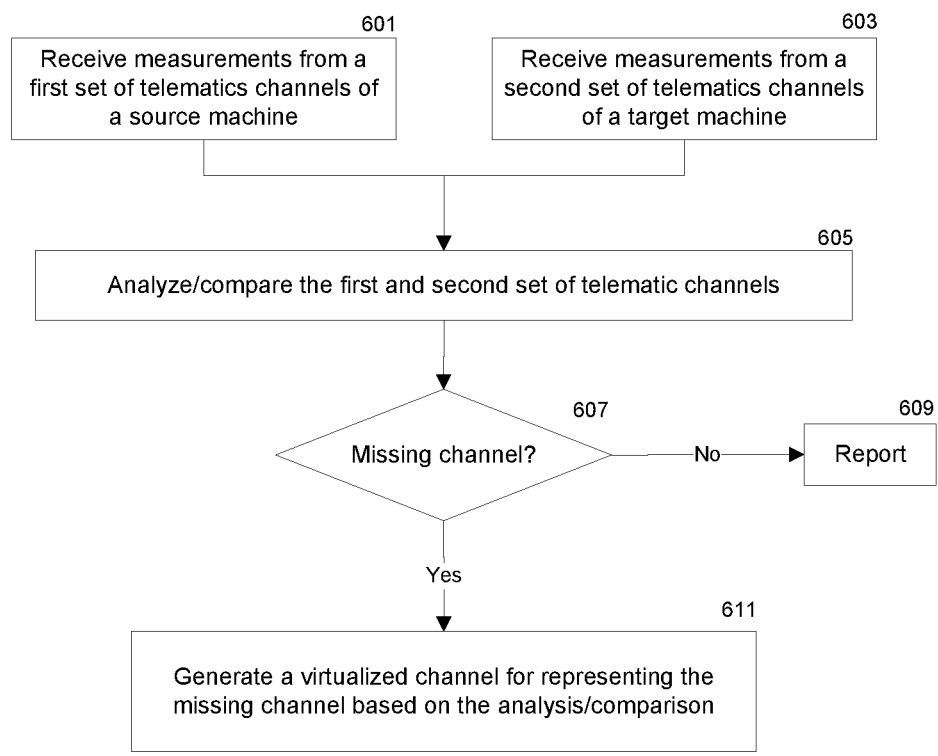
FIG. 6 is a flow diagram showing a method for communicating with a target machine via a virtualized channel in accordance with embodiments of the present technology.

FIG. 6 is a flow diagram showing a method 600 for communicating with a target machine in accordance with embodiments of the present technology. At step 601, measurements from a first set of telematics channels of a source machine are received. At step 603, measurements from a second set of telematics channels of a target machine are received. Steps 601 and 603 can be implemented in parallel.

At step 605, the first and second sets of telematics channels are analyzed and/or compared, based on the received measurements corresponding to these channels. At decision block 607, the process determines whether there is a missing channel, based on the result of the analysis/comparison at step 605. If determination is negative, then the process continues to step 609 and create a report. If the determination is affirmative, then the process continues to step 611. At step 611, a virtualized channel is generated based on the result of the analysis/comparison at step 605.

Figure 7:
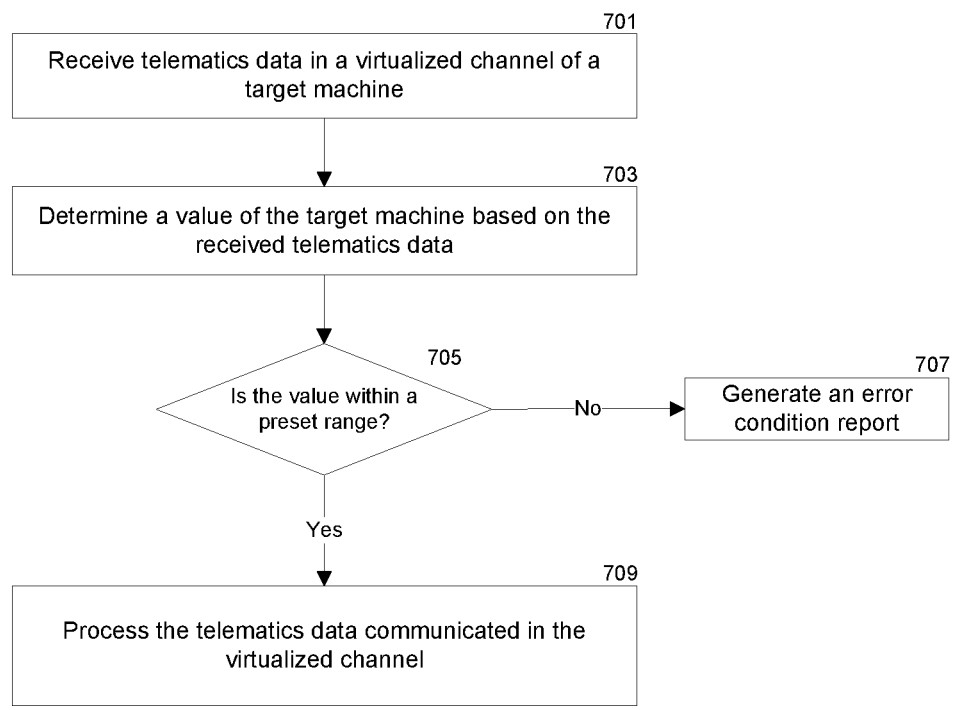
FIG. 7 is a flow diagram showing a method for error reporting when communicating with a target machine in accordance with embodiments of the present technology.

FIG. 7 is a flow diagram showing a method 700 for error reporting when communicating with a target machine via a virtualized channel in accordance with embodiments of the present technology. At step 701, telematics data is received in a virtualized channel. For example, the virtualized channel is used to transmit measurements or information associated with a steering angle of the target machine. At step 703, based on the received telematics data, a value of the target machine can be used to a value. The steering angle can be determined as "45 degrees," according to the received telematics data.

At step 705, a decision is made regarding whether the determined value is within a predicted range. For example, there can be a preset range for the steering angle of the target machine, such as "0 to 30 degrees." In this example, the determined value "45 degrees" is not within the preset range. As a result, the process moves to step 707 and generates an error condition report for further process. The error condition report can be used to improve the process of analyzing the telematics channels. If the decision shows that the determined value is within the predicted range, the process moves to 709 to process the telematics data (e.g., implement a message therein, store/transmit the measurements therein, etc.)

INDUSTRIAL APPLICABILITY

The systems and methods described herein can generate a virtualized channel (e.g., Channel V shown in FIGS. 1 and 2) for a target device (e.g., the target device 102 or 202) and utilize the virtualized channel to monitor and communicate with the target device. The virtualized channel is generated based on analyzing a set of telematics channels of a source machine (e.g., the source device 101 or 201). The analysis includes identifying a missing channel in the set of telematics channels and then deriving a mathematical function representing the relationships among the set of telematics channels. In operation, the virtualized channel can then be utilized to monitor and communicate with the target device. It is particularly advantageous for an operator or a server that manages or monitors a group of machines with different telematics channels. The present systems and methods can be implemented to manage, monitor, and communicate multiple industrial machines, vehicles and/or other suitable devices such as mining machines, trucks, corporate fleets, etc.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method for virtualizing communications within a plurality of telematics channels operatively connected to a target machine, the method comprising:
receiving measurements from a first set of telematics channels of a source machine;
analyzing the first set of telematics channels of the source machine to derive a mathematical function representing a relationship of each channel within the first set of telematics channels;
identifying a second set of telematics channels of the target machine, wherein the second set of telematics channels includes at least one missing channel from the first set of telematics channels;
generating a virtualized channel representing the at least one missing channel from the first set of telematics channels;
predicting one or more values for the virtualized channel;
receiving measurements from the second set of telematics channels from the target machine;
applying the mathematical function to the target machine based upon the one or more predicted values of the virtualized channel and the received measurements from the second set of telematics channels from the target machine; and
monitoring whether the measurement from the second set of telematics channels and the virtualized channel conform to the mathematical function.

2. The method of claim 1, further comprising:
deriving the mathematical function at least partially based on a machine learning (ML) process.

3. The method of claim 1, further comprising:
deriving the mathematical function at least partially based on a linear regression process.

4. The method of claim 1, further comprising:
deriving the mathematical function at least partially based on a logistic regression process.

5. The method of claim 1, wherein the virtualized channel is associated with a steering angle of the target machine.

6. The method of claim 5, wherein the received measurements from the target machine include a peak frame bias of the target machine.

7. The method of claim 5, wherein the received measurements from the target machine include a ground speed of the target machine.

8. The method of claim 5, wherein the received measurements from the target machine include a payload status of the target machine.

9. The method of claim 5, wherein the received measurements from the target machine include a throttle pedal position of the target machine.

10. The method of claim 1, wherein analyzing the first set of telematics channels of the source machine comprises normalizing the first set of telematics channels.

11. The method of claim 1, wherein analyzing the first set of telematics channels of the source machine comprises binarizing the first set of telematics channels based on a threshold.

12. The method of claim 1, wherein:
the source machine is a first vehicle having a first number of sensors;
the target machine is a second vehicle having a second number of sensors; and
the first number is greater than the second number.

13. A system, comprising:
a processor; and
a memory communicably coupled to the one processor, the memory comprising computer executable instructions, when executed by the processor, to:
receive measurements from a first set of telematics channels of a source machine;
analyze the first set of telematics channels of the source machine to derive a mathematical function representing the relationship of each channel within the first set of telematics channels;
identify a second set of telematics channels of the target machine, wherein the second set of telematics channels includes at least one missing channel from the first set of telematics channels;
generate a virtualized channel representing the at least one missing channel from the first set of telematics channels;
predict one or more values for the virtualized channel;
receive measurements from the second set of telematics channels from the target machine;
apply the mathematical function to the target machine based upon the one or more predicted values of the virtualized channel and the received measurements from the second set of telematics channels from the target machine; and
monitor whether the measurement from the second set of telematics channels and the virtualized channel conform to the mathematical function.

14. The system of claim 13, wherein the mathematical function is derived at least partially based on a machine learning (ML) process.

15. The system of claim 13, wherein the mathematical function is derived at least partially based on a linear regression process.

16. The system of claim 13, wherein the mathematical function is derived at least partially based on a logistic regression process.

17. The system of claim 13, wherein the virtualized channel is associated with a steering angle of the target machine.

18. The system of claim 17, wherein the received measurements from the target machine include a peak frame bias of the target machine and a ground speed of the target machine.

* * * * *